Oct. 30, 1945.  E. W. MILLER  2,388,173

GENERATIVE GRINDING MACHINE

Filed Dec. 20, 1940  3 Sheets-Sheet 1

Inventor
Edward W. Miller
by Wright, Brown,
Quinby & May
Attys.

Oct. 30, 1945.  E. W. MILLER  2,388,173
GENERATIVE GRINDING MACHINE
Filed Dec. 20, 1940  3 Sheets-Sheet 2
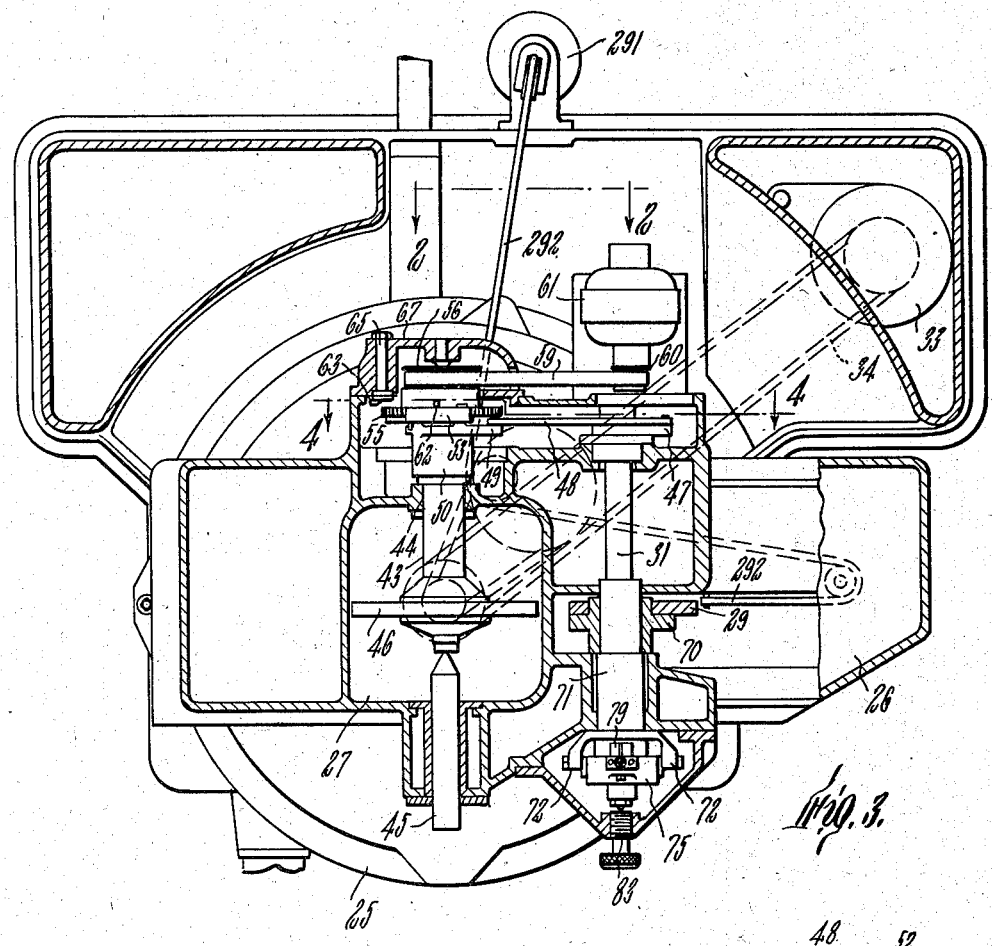
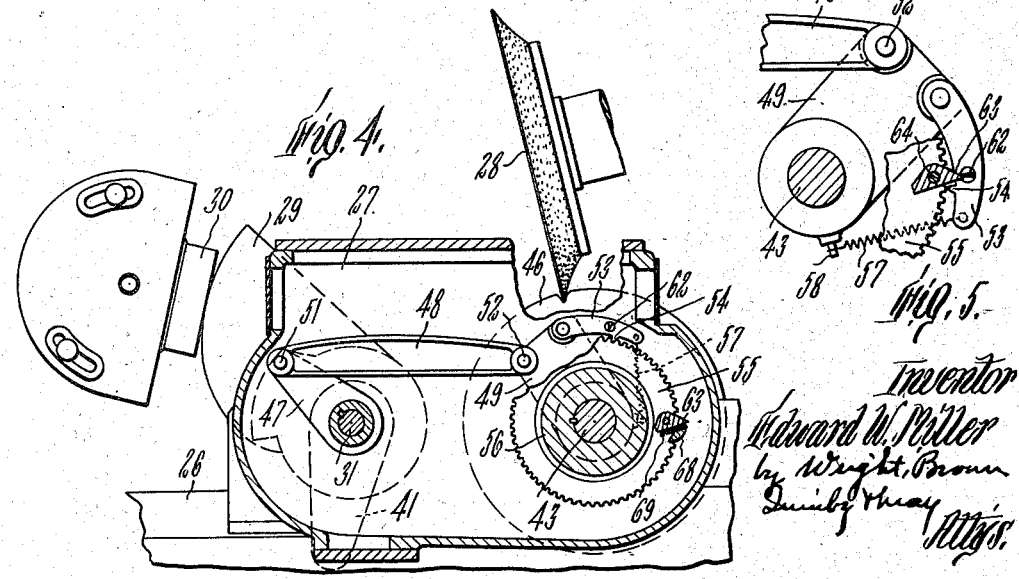

Oct. 30, 1945.   E. W. MILLER   2,388,173
GENERATIVE GRINDING MACHINE
Filed Dec. 20, 1940   3 Sheets-Sheet 3
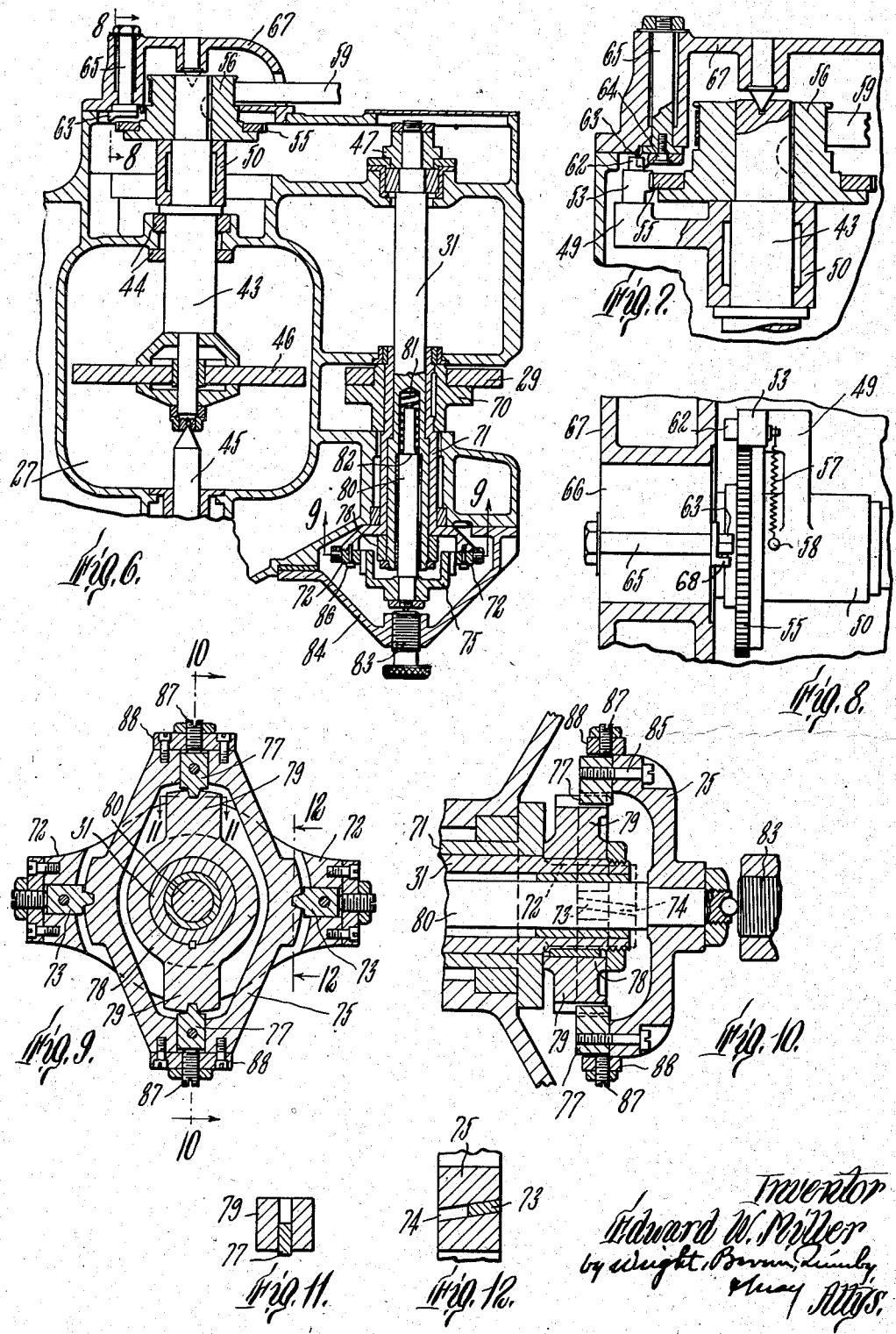

Patented Oct. 30, 1945

2,388,173

UNITED STATES PATENT OFFICE 2,388,173

GENERATIVE GRINDING MACHINE

Edward W. Miller, Springfield, Vt., assignor to The Fellows Gear Shaper Company, Springfield, Vt., a corporation of Vermont Application December 20, 1940, Serial No. 370,955

23 Claims. (Cl. 51—123)

The invention here disclosed is concerned with a machine for generating the face curves of gear teeth, the teeth of gear shaper cutters, and other curved surfaces capable of generation by combined movements of rotation and translation with reference to a cutting tool. In the preferred embodiments of the invention, including that illustratively shown and described herein, the operating tool is a grinding wheel; and for that reason the machine is called a grinding machine. But this title is not intended as a limitation to grinding in contradistinction to cutting by tools of other characteristics, such as milling cutters for instance. Hence although in the following description I shall refer generally to the action of the machine as grinding and to the tool as a grinding wheel, it is to be understood that such description is intended to include, as well, equivalent cutters of specifically different characteristics and the operations performed by their use. Likewise the use of the term "gear" in the following description to designate the work piece operated on by the machine, is intended to embrace generically gear shaper cutters and other articles having curved surfaces capable of being generated by means like or equivalent to the specific agencies herein disclosed.

The invention is more particularly related to generating machines of the character disclosed in my pending application filed March 16, 1939, Serial No. 262,125, on which Letters Patent No. 2,257,850 were granted October 7, 1941. Its general objects are the same as those sought and accomplished by said prior invention and it has the further and more specific object of providing a simpler and more compact means for imparting rotary movement to the work piece, indexing the work piece to perform the cutting operation on different parts thereof, and giving increments of feed to the work so that the amount of material necessary to be removed in bringing the surfaces operated on to finished dimensions may be removed in a succession of cuts.

The invention consists in the means for accomplishing the foregoing, and related, objects described in the following specification with reference to the drawings, and in all substantial equivalents of the machine and parts thereof so illustrated.

Referring to the drawings,

Fig. 3 is a horizontal section on line 3—3 of Fig. 1;

Fig. 4 is a vertical section taken on line 4—4 of Fig. 3 viewed in the direction of the arrows applied to that line, structural parts of the machine being removed to afford a clear view of the operating parts;

Fig. 5 is a fragmentary view of a portion of the indexing mechanism shown in Fig. 4, drawn on a larger scale and shown in a different position from that of Fig. 4;

Fig. 6 is a partial horizontal section of the machine taken on line 6—6 of Fig. 1;

Fig. 7 is a fragmentary section similar to Fig. 6, showing a part of the indexing means in the same position as represented in Fig. 5;

Figure 1:
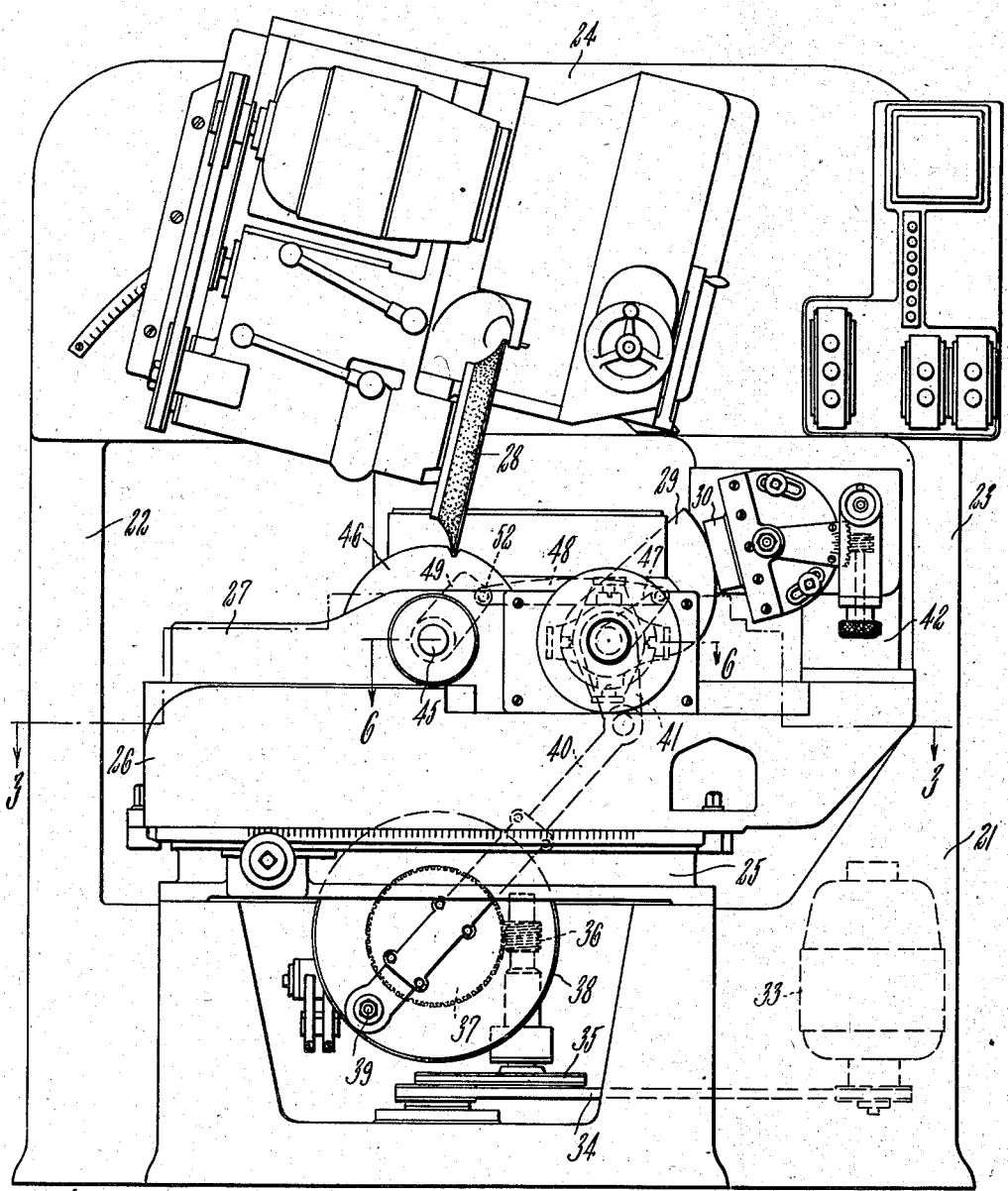
Fig. 1 is a front elevation of an illustrative machine in which the invention is embodied.
Figure 2:
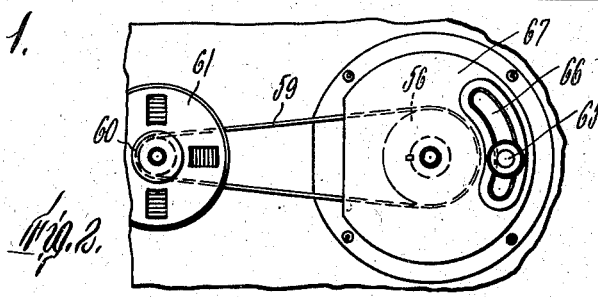
Fig. 2 is a detail rear elevation of the means by which indexing rotation is imparted to the work; this figure showing the parts referred to as viewed in the direction of the arrows 2, 2, which appear in Fig. 3.

Figs. 8 and 9 are fragmentary sectional views taken on lines 8—8 and 9—9 respectively of Fig. 6;

Fig. 10 is a section taken on line 10—10 of Fig. 9;

Figs. 11 and 12 are fragmentary sectional views taken on lines 11—11 and 12—12 respectively of Fig. 9.

Like reference characters designate the same parts wherever they occur in all the figures.

In its main features, the machine is like that shown in my prior application Serial No. 262,125; (on which Letters Patent 2,257,850 were granted October 7, 1941), having a supporting structure consisting of a base 21, uprights 22 and 23, and a cross beam 24. The base supports an annular bed 25 in a horizontal plane with provision for angular adjustment about a vertical axis so that curves of right cylindrical or helicoidal form may be generated. A table 26 secured on the bed 25 supports a work carriage 27 with guiding means to limit the movements of such carriage to a rectilinear path. A grinding wheel 28 is supported by the cross beam 24 above the work carriage with provisions for adjustment toward and away from the carriage and also angularly about a horizontal axis transverse to the path of the carriage so as to incline the plane of rotation of the grinding wheel variously to the path in which the work piece is transported by the carriage.

Reciprocating movement is given to the carriage in one direction by a cam or former 29 reacting against an abutment 30, and in the opposite direction by a weight 291 which applies force to the carriage through a cord 292 and holds the propelling face of cam 29 constantly against the contiguous face of abutment 30. The cam is mounted on a shaft 31 and coupled thereto by an adjustable coupling which constitutes a novel feature of the present invention and is later described in detail. Oscillative movement is imparted to the shaft from a motor 33 by a belt and pulley transmission 34, 35, worm and wheel gearing 36, 37, crank disk 38 with adjustable crank 39, adjustable connecting rod 40, and arm 41 connected with the cam; all as described in my said earlier filed patent.

A bracket 42, rising from the table 26, supports the abutment 30 with provision for adjustment, both as to position and as to the inclination of its contact face on which the cam 29 acts. A work spindle 43 is mounted on the carriage by a bearing 44 and dead center 45, with its axis parallel to that of the shaft 31. It is designed to support work pieces of various diameters and other dimensions, one of which is represented at 46, and to carry such work pieces back and forth beneath the grinding wheel while rotating the work piece at a suitable angular ratio to cause generation of the prescribed form by the grinding wheel. In the present illustration the forms to be generated are involute curves.

As thus far described the machine is substantially like that shown in my said patent, to which reference is made for fuller explanation and for description of certain details not necessary to repeat herein. I will now pass to the features which distinguish the present invention from the prior one and are herein claimed.

First, the means for rotating the work spindle: An arm 47 keyed to the cam shaft 31 is coupled by a connecting rod 48 with an arm 49 having a hub 50 rotatably mounted on the work spindle. The distance of the pivot pin 51 by which arm 47 is coupled to the connecting rod, from the axis of shaft 31 is equal to the distance of the pivot 52, which couples the connecting rod and arm 49, from the axis of the work spindle; and the length of the connecting rod between the pivot centers is equal to the distance between the axes of cam shaft and work spindle. Arm 49 carries a pivoted pawl 53 having a tooth 54 which fits notches in the circumference of an index plate 55 mounted on a pulley 56 (Fig. 6) which is keyed to the work spindle. A tension spring 57, connected at one end to the pawl and at the other to an anchorage 58 on the arm 49, forces the pawl toward the spindle axis and normally holds its tooth 54 in full mesh with one or another of the notches in the index plate. Thus angular movements of the cam shaft are transmitted in equal degree to the work spindle.

Second, the means for indexing the work: The pulley 56 is embraced by a belt 59 which also passes around a pulley 60 driven by a constantly running motor 61 (later referred to as the indexing motor) supported by the carriage 27. The belt slips when the pawl 53 is interlocked with the index plate 55, and so does not rotate the spindle except when the pawl is withdrawn from the index plate. It is then effective to turn the spindle instantly.

Such withdrawal of the pawl is effected by the engagement of a pin 62 on the pawl with a trip 63 mounted on the carriage in position to be engaged by the pin 62 when the work piece has been rolled clear of the grinding wheel. It may be noted that withdrawing movement of the carriage from the grinding wheel is to the left, as represented in Figs. 4 and 5, (to the right with respect to Figs. 1 and 3), and that the arm 49 and work piece are then turned in clockwise rotation with respect to Figs. 4 and 5, (counterclockwise with respect to Fig. 1).

Trip 63 is mounted on a pivot 64 carried by a stud 65 which occupies, and is adjustably clamped in, a curved slot 66 (concentric with the work spindle) in the housing 67 which forms a part of the carriage structure and encloses the pulley 56. By adjustment of stud 65 in slot 66 the trip 63 may be placed to accommodate various distances of translation and rotation required for different work pieces, so as to cause indexing as soon as desired after the work piece has rolled clear of the grinding wheel.

Both the pin and trip are wedge shaped, with nearly sharp edges in the portions which make contact with each other, in order to permit return of the pawl into engagement with the index plate in an exceedingly brief interval of time after having been disengaged from the plate. They are located with an overlap sufficient only to cause complete withdrawal of the pawl tooth from the notches of the index plate with minimum clearance. Thus the period during which the pawl remains clear of the index plate is shorter than the time required for the indexing means to turn the spindle through the angle between adjacent notches of the index plate.

A lug 68 (Fig. 4) projects from the inner end of stud 65 adjacent to the trip in a position such that it serves as a stop for the trip, supporting the latter rigidly in operative position for withdrawing the pawl from the index plate. But the trip may turn about its pivot 64 away from the lug 68, permitting pin 62 to pass by it, when the pawl is carried in the return direction after having been so withdrawn, and reengaged with the disk. A leaf spring 69 is secured at one end to lug 68 and its other end bears on a portion of the trip inward from the pivot 64, exerting force in the direction to hold the trip against the lug. This spring is adapted to yield far enough to permit displacement of the trip by the pin 62 out of the path of the latter when the pawl is carried in the return direction in engagement with the index plate.

Third, rotary feed for the work piece: The surface of the work piece to be cut by the grinding wheel is brought into the exact position for cutting, and may be advanced, from time to time so as to cause removal of additional material in one or more successive cuts, by altering the angular relationship between the work spindle 43 and the cam 29. This is accomplished by means of the adjustable coupling between the cam and the shaft 31, previously referred to. The cam is secured to a holder 70 keyed to a sleeve 71 which is fitted closely to the shaft 31 but is free to rotate around the shaft. Said sleeve carries, in rigid connection, two lateral arms 72, the extremities of which extend parallel to the shaft so as to embrace a yoke 75, presently described. On each arm there is mounted an inwardly directed key 73, here shown as a helical spline or tooth, but which may equally well be a pin of circular cross section at its protruding extremity. Both keys 73 occupy inclined, preferably helical, keyways or grooves 74 (Fig. 12) in the outer faces of those portions of yoke 75 which are embraced by the extremities of arms 72. Said yoke embraces the outer end of shaft 31 and carries two inwardly directed keys, splines or teeth 77, of any suitable formation, located in an axial plane of the shaft substantially at right angles to the diameter in which the mid length points of the splines 73 are located. A collar 78 is keyed and clamped on the outer end of shaft 31, which protrudes from the sleeve 71, in the space embraced by the yoke 75, and has two diametrically opposite arms located in said space, in the outer faces of which are keyways or grooves, complemental to said splines and in which the latter are received, extending lengthwise of the shaft.

Yoke 75 is clamped on the outer end of a rod or stud 80, the major part of which is contained in a coaxial bore in shaft 31, with freedom to rotate and slide endwise. Separated bushings fitted in the shaft bore provide bearings for supporting the stud. A spring 81, confined between a shoulder 82 on stud 80 and the inner end of the bore in the shaft, tends to displace the stud outwardly, and holds its outer end against an adjustable abutment 83 which is screw threaded through the housing cover 84 (Fig. 6) and has an external knob by which it may be manually turned. Adjustment of the abutment causes the yoke to be moved along the axis of the shaft, and the corresponding movement of the inclined keyways 74 in the yoke with respect to the keys of the arms 72, which have no axial movement, causes the yoke to be rotated through an angle of greater or less degree proportional to the extent of its axial movement. Rotation of the yoke is transmitted through the keys 77 and arms 78 to the shaft 31, and from the latter, through arm 47, connecting rod 48 and arm 49 to the work spindle.

It will be noted from Fig. 9 that the engaging parts of the keys and keyways are tapered. The keys are clamped to the arms, in which they are respectively mounted, by means of bolts 85 and 86, which are designed to permit a limited adjustment of the keys; and abutment screws 87 are mounted in bridge plates 88 on the respective arms to bear on the outer ends of the keys and hold them in close sliding contact with the sides of the respective keyways. The adjustment thus provided eliminates backlash and takes up the effects of wear.

It is not essential that the inclined keys and keyways be provided between the arms 72 and the yoke, rather than between the yoke and the arms 78, or that the keys and keyways between the latter arms and the yoke be parallel to the axis, rather than inclined. Either pair of keys and keyways may be inclined and the other parallel to the axis, or both pairs may be inclined in equal or unequal degree, and the angles of inclination may be of any desired degree, according to the degree of angular movement desired to be given to the work spindle in consequence of a given displacement of the abutment 83. The keyways of the two groups may be of opposite hands, or of the same hand with different degrees of inclination, according to the coarseness or fineness of angular adjustment desired.

Neither is it essential that the arms connected with the shaft and with cam holder respectively be in pairs. A single arm, or more than two arms, of each category may be employed, and a connector equivalent in function to the yoke, but possibly different in form and mounted in a different manner, may be substituted for the specific yoke here shown, all within the scope of the protection herein claimed.

It will be plain from the foregoing description that oscillation of the cam shaft 31 causes the work piece to be translated and rotated in a manner to cause that part which is to be acted on by the grinding wheel to roll back and forth over the cutting face of the wheel, with generation of a curve conditioned by the shape of the cam and the inclinations of the abutment and grinding wheel with reference to the path in which the work carriage travels. When the carriage has been retracted toward the abutment far enough to remove the outside circumference of the work piece away from the rim of the grinding wheel, the pin 62 of the index pawl 53 engages the trip 63, previously adjusted along slot 66 to the proper point, and disconnects the pawl from the index plate 55. Instantly the belt 59 driven by the indexing motor 61 begins to rotate the work spindle 43, and immediately thereafter the pin passes the trip and allows the pawl to reengage the index plate before the latter has been turned through an angle greater than that between two adjacent notches. Traverses of the carriage forward and back, and indexing of the work at the end of each return traverse, are repeated until all the teeth, in the case of a gear or gear shaper cutter, or the duplicate surfaces of other articles, have been ground. If a second cut is to be taken, the abutment 83 is adjusted to advance the work spindle through a small angle. The adjustment accomplished by this abutment may be made in any case before commencing the cutting action, when the work piece has been secured to the spindle in not quite the correct position and a fine adjustment is needed to cause cutting to the right depth. Although, in this disclosure, the adjustment of the abutment 83 is effected manually, it will be obvious that automatic means may be provided for the purpose, and may be operated automatically to impart an increment of angular advancement to the work after all the teeth have been once rolled across the grinding wheel face. Any number of successive feeding steps may be thus taken, as needed to bring the parts being ground to finished dimensions.

What I claim and desire to secure by Letters Patent is:

1. A machine for generating the face curves of gear teeth, gear cutter teeth, and other curved surfaces capable of generation by combined movements of rotation and translation, which comprises a rotating cutting tool mounted in fixed location, a work carriage displaceable relatively to said cutting tool, a cam rotatably mounted on said carriage, an abutment located in thrust receiving engagement with the face of said cam, a work spindle rotatably mounted on the carriage with its axis parallel to that of the cam, a connecting rod, and means comprising pivots coupling said rod to said cam and work spindle at points equidistant from both axes and at a distance from each other equal to the distance between said axes.

2. In a machine of the character set forth, a carriage, a cam shaft and a work spindle mounted rotatably in said carriage with their axes parallel, a cam mounted on said cam shaft, an abutment in thrust receiving engagement with said cam for causing the carriage to be moved translatively when the cam is rotated, a cutting tool having a revolving active portion in position to perform a cutting action on a work piece carried by said spindle when the carriage is so moved, arms connected to the cam shaft and spindle respectively, and a connecting rod pivotally connected with both arms; said arms, connecting rod, and a straight line perpendicular to and intersecting the axes of the shaft and spindle constituting a parallelogram.

3. In a curve generating machine, a carriage, a spindle mounted rotatably on said carriage, a cam mounted rotatably on said carriage, means for oscillating said cam about its axis of rotation, an abutment in thrust-receiving engagement with said cam for causing movement of the carriage, a pawl carrier rotatable about the axis of the spindle independently of the spindle, means for transmitting angular movement from the cam to the pawl carrier, a pawl mounted on the pawl carrier, and a plate secured to the spindle in detachably interlocked connection with said pawl through which angular movement of the pawl carrier is transmitted to the spindle.

4. In a curve generating machine, a carriage, a spindle mounted rotatably on said carriage, a cam mounted rotatably on said carriage, means for oscillating said cam about its axis of rotation, an abutment in thrust-receiving engagement with said cam for causing movement of the carriage, a pawl carrier rotatable about the axis of the spindle independently of the spindle, means for transmitting angular movement from the cam to the pawl carrier, a pawl mounted on the pawl carrier, a plate secured to the spindle in detachably interlocked connection with said pawl through which angular movement of the pawl carrier is transmitted to the spindle, motive means in non-positive connection with the spindle, tending constantly to rotate it in one direction, and a trip in the path of a portion of the pawl arranged to disengage the pawl from said plate, permitting the spindle to be turned by said motive means.

5. In a generating machine having a movable carriage and a spindle rotatably mounted on said carriage, spindle rotating and indexing means comprising a notched index plate secured to the spindle, motive means in non-positive connection with the spindle tending constantly to rotate it in one direction, a pawl carrier movable rotatably about the axis of the spindle, independently of the spindle, a pawl mounted on said carrier having a tooth adapted to enter different notches of the index plate and normally projecting into one of them, means for oscillating the pawl carrier and thereby the spindle, and a trip in the path of a part of the pawl arranged to engage such part and disconnect the pawl from the index plate and permit the spindle to be turned by said motive means.

6. In a generating machine having a movable carriage and a spindle rotatably mounted on said carriage, spindle rotating and indexing means comprising a notched index plate secured to the spindle, motive means in non-positive connection with the spindle tending constantly to rotate it in one direction, a pawl carrier movable rotatably about the axis of the spindle, independently of the spindle, a pawl mounted on said carrier having a tooth adapted to enter different notches of the index plate and normally projecting into one of them, means for oscillating the pawl carrier and thereby the spindle, and a trip in the path of a part of the pawl arranged to engage such part and disconnect the pawl from the index plate and permit the spindle to be turned by said motive means, the trip being located where it is so engaged by the pawl at a point short of the limit of travel of the engaging part of the pawl, and such engaging part and the trip being formed to permit reconnection of the pawl with the plate before arrival of said part at said limit of travel.

7. In a generating machine having a movable carriage and a spindle rotatably mounted on said carriage, spindle rotating and indexing means comprising a notched index plate secured to the spindle, motive means in non-positive connection with the spindle tending constantly to rotate it in one direction, a pawl carrier movable rotatably about the axis of the spindle, independently of the spindle, a pawl mounted on said carrier having a tooth adapted to enter different notches of the index plate and normally projecting into one of them, means for oscillating the pawl carrier and thereby the spindle, and a trip in the path of a part of the pawl arranged to engage such part and disconnect the pawl from the index plate and permit the spindle to be turned by said motive means, the trip being adjustable about the axis of the spindle and located to be so engaged by the pawl at a point short of the limit of travel of the part of the pawl which so engages it.

8. In a generating machine having a movable carriage and a spindle rotatably mounted on said carriage, spindle rotating and indexing means comprising a notched index plate secured to the spindle, motive means in non-positive connection with the spindle tending constantly to rotate it in one direction, a pawl carrier movable rotatably about the axis of the spindle, independently of the spindle, a pawl mounted on said carrier having a tooth adapted to enter different notches of the index plate and normally projecting into one of them, means for oscillating the pawl carrier and thereby the spindle, and a trip in the path of a part of the pawl arranged to engage such part and disconnect the pawl from the index plate and permit the spindle to be turned by said motive means, the trip and the part of the pawl which engages it being each beveled substantially to an edge and being so arranged that such edge of the engaging part passes over and beyond the edge of the trip when the pawl has been disconnected from the index plate and before it has been carried thereafter through an arc around the spindle axis as great as the arc between adjacent notches of the plate.

9. A curve generating machine comprising a carriage, a spindle and a cam shaft mounted to rotate about parallel axes on said carriage, means for transmitting rotation from the cam shaft to the spindle, a cam mounted coaxially with, and relatively rotatable with respect to, the cam shaft, an abutment in thrust-receiving engagement with the cam, means for turning the cam back and forth about its axis of rotation whereby to displace the carriage, and a coupling between the cam and cam shaft for transmitting rotation from one to the other, said coupling having provisions for adjustment to alter the angular relationship between the cam and the shaft.

10. A generating machine as set forth in claim 9, in which the coupling comprises arms connected respectively with the cam and with the shaft, a yoke having splined engagement with the arms of both the cam and the shaft and being relatively movable in the direction of the shaft axis, the splined connection between the yoke and one of said arms having an angular displacement around the axis of the shaft, whereby such axial movement causes a change in the angular relationship of the respective arms, and means for displacing the yoke in the axial direction.

11. A curve generating machine comprising a supporting structure, a carriage mounted for movement on the supporting structure, a cutting tool, a cam abutment, a work spindle adapted to support a work piece to be acted on by said cutting tool, a cam shaft parallel to said spindle, a cam mounted coaxially with said cam shaft in position to engage said abutment and exert thrust thereupon, said abutment, cutting tool, cam shaft and spindle being relatively mounted on the supporting structure and carriage in a manner such that thrust exerted by the cam on the abutment causes a relative traverse between the cutting tool and work spindle, means for transmitting rotation from the cam shaft to the spindle, and adjustable means for altering the angular relationship between the cam and cam shaft about their common axis.

12. In a machine of the character described, a shaft, a bar mounted in said shaft for movement rotatably and axially with respect thereto, an arm secured to the shaft, a sleeve mounted rotatably on the shaft, an arm projecting laterally from said sleeve, and a yoke secured to said bar; the yoke having splined connections with both the aforesaid arms, and one of such splined connections being inclined, whereby axial movement of the yoke causes relative rotation between the shaft and sleeve.

13. The combination of a shaft, a cam mounted on said shaft and rotatable about the axis thereof, an arm connected with said cam, an arm connected with the shaft, a yoke supported by the shaft with capacity for relative movement axially thereof, and splined connections between said yoke and both of the before named arms, one of said splined connections being angularly disposed with respect to said axis.

14. The combination of a shaft having oppositely extending lateral arms, a yoke embracing said shaft and arms having inwardly directed splines engaged with keyways in the outer extremities of said arms, a sleeve mounted rotatably on said shaft, arms projecting from opposite sides of said sleeve embracing said yoke, splines on the last named arms entering keyways in the faces of the yoke which are embraced by said arms, and means for adjusting the yoke axially of the shaft, the splined connection between the yoke and one pair of said arms being angularly disposed with respect to the shaft axis.

15. A machine for generating the face curves of gear teeth, gear cutter teeth, and other curved surfaces capable of generation by combined movements of rotation and translation, which comprises a rotating cutting tool mounted in fixed location, a work carriage, a work spindle rotatably mounted on the carriage, said carriage being movable back and forth in a path transverse to the axis of said spindle and being located to carry a work piece mounted on the spindle into and out of operative engagement with the cutting tool, a cam rotatably mounted on the carriage, an abutment located in thrust receiving engagement with the face of said cam, whereby rotation of the cam is effective to cause displacement of the carriage in its prescribed path, means for transmitting rotary movement from the cam to the work spindle, whereby to impart to work pieces a rotary component of motion in addition to the translative component given by displacement of the carriage, means for indexing the work spindle relatively to said rotation transmitting means when the work is clear of the cutting tool, so as to bring different portions of a work piece in position to be operated on by the tool, and means for effecting an angular displacement between the cam and rotation transmitting means, whereby to give increments of feeding movement to the work piece.

16. In a curve generating machine, a translatively movable carriage, a spindle rotatably mounted on said carriage, a cam mounted rotatably on said carriage, means for oscillating said cam about its axis of rotation, an abutment in thrust receiving engagement with said cam for causing movement of the carriage when the cam is so oscillated, a pawl carrier rotatable about the axis of the spindle independently of the spindle, means for transmitting angular movement from the cam to the pawl carrier, a pawl mounted on the pawl carrier, a plate secured to the spindle in detachably interlocked connection with said pawl through which angular movement of the pawl carrier is transmitted to the spindle, and means for disengaging the pawl from said plate when the carriage arrives at a prescribed point in its travel, whereby to permit indexing of the spindle relatively to the pawl carrier.

17. In a curve generating machine, a translatively movable carriage, a spindle rotatably mounted on said carriage, a cam mounted rotatably on said carriage, means for oscillating said cam about its axis of rotation, an abutment in thrust receiving engagement with said cam for causing movement of the carriage when the cam is so oscillated, a pawl carrier rotatable about the axis of the spindle independently of the spindle, means for transmitting angular movement from the cam to the pawl carrier, a pawl mounted on the pawl carrier, a plate secured to the spindle in detachably interlocked connection with said pawl through which angular movement of the pawl carrier is transmitted to the spindle, means for disengaging the pawl from said plate when the carriage has reached a prescribed point in its travel, means operable to rotate the spindle and plate relatively to the pawl carrier when the pawl is so disengaged, and means for causing reengagement of the pawl with the plate after such independent rotation of the spindle and plate.

18. In a curve generating machine, a translatively movable carriage, a spindle rotatably mounted on said carriage, a cam mounted rotatably on said carriage, means for oscillating said cam about its axis of rotation, an abutment in thrust receiving engagement with said cam for causing movement of the carriage when the cam is so oscillated, a pawl carrier rotatable about the axis of the spindle independently of the spindle, means for transmitting angular movement from the cam to the pawl carrier, a pawl mounted on the pawl carrier, a plate secured to the spindle in detachably interlocked connection with said pawl through which angular movement of the pawl carrier is transmitted to the spindle, means for disengaging the pawl from said plate when the carriage arrives at a prescribed point in its travel, whereby to permit indexing of the spindle relatively to the pawl carrier, and means for effecting angular displacement between the cam and the means by which angular movement is transmitted therefrom to the pawl carrier, whereby to impart an increment of feeding movement to the spindle.

19. A curve generating machine comprising a carriage mounted to move translatively, a spindle and a cam shaft mounted in said carriage rotatably with their axes of rotation transverse to the path of movement of the carriage, means for transmitting rotation from the cam shaft to the spindle, a cam mounted coaxially with, and relatively rotatable with respect to, the cam shaft, an abutment in thrust receiving engagement with the cam, means for turning the cam back and forth about its axis of rotation whereby to displace the carriage, a coupling between the cam and cam shaft having provisions for altering the angular relationship between the cam and shaft and being operable to transmit rotation from one to the other, and means for effecting indexing displacement between said spindle and said rotation transmitting means.

20. A curve generating machine comprising a carriage mounted to move translatively, a cam shaft rotatably mounted on said carriage with its axis transverse to the path of movement of the carriage, a cam mounted coaxially with said cam shaft and being relatively rotatable with respect thereto, an abutment in thrust receiving engagement with the cam, means for turning the cam back and forth about its axis, whereby to displace the carriage, a coupling between the cam and cam shaft having provisions for adjustment to alter the angular relationship between the cam and the shaft and being operable to transmit rotation from one to the other, a work spindle rotatably mounted on the carriage, an index plate secured to said spindle, a pawl carrier mounted to rotate about the axis of the spindle, a pawl mounted on said carrier and arranged to make interlocking engagement with the index plate at any one of a number of different points, and means for transmitting rotation from the cam shaft to said pawl carrier.

21. In a generating machine, a translatively movable carriage, a work spindle rotatably mounted on said carriage with its axis transverse to the direction in which the carriage moves, a cam rotatably mounted on said carriage, a relatively stationary abutment in thrust receiving relation with said cam, means for effecting simultaneous rotation of the cam about its axis, with thrust exertion against said abutment, and translative movement of the carriage, a pawl carrier angularly movable about the axis of the spindle independently of the spindle, an index plate secured to the work spindle, means for transmitting angular movement from the cam to said pawl carrier, and a pawl mounted on the pawl carrier in connection with said index plate for transmitting angular movement to the spindle.

22. In a generating machine, a translatively movable carriage, a work spindle rotatably mounted on said carriage with its axis transverse to the direction in which the carirage moves, a cam rotatably mounted on said carriage, a relatively stationary abutment in thrust receiving relation with said cam, means for effecting simultaneous rotation of the cam about its axis, with thrust exertion against said abutment, and translative movement of the carriage, a pawl carrier angularly movable about the axis of the spindle independently of the spindle, an index plate secured to the work spindle, means for transmitting angular movement from the cam to said pawl carrier, a pawl mounted on the pawl carrier in connection with said index plate for transmitting angular movement to the spindle, and a trip located across the path of a portion of the pawl in position to cause disengagement of the pawl from said index plate, whereby to permit indexing rotation of the spindle relatively to the pawl carrier.

23. In a generating machine, a translatively movable carriage, a work spindle rotatably mounted on said carriage with its axis transverse to the direction in which the carriage moves, a cam rotatably mounted on said carriage, a relatively stationary abutment in thrust receiving relation with said cam, means for effecting simultaneous rotation of the cam about its axis, with thrust exertion against said abutment, and translative movement of the carriage, a pawl carrier angularly movable about the axis of the spindle independently of the spindle, an index plate secured to the pawl carrier, means for transmitting angular movement from the cam to said pawl carrier, an indexing motor in rotation transmitting relation to said spindle, a pawl mounted on the pawl carrier normally interlocked with said index plate for causing the plate to rotate with the pawl carrier, and a trip located in the path of a portion of said pawl operable to disengage the pawl from the plate and permit rotation of the spindle by said indexing motor.

EDWARD W. MILLER.